(12) United States Patent
Bierhuizen

(10) Patent No.: US 6,899,440 B2
(45) Date of Patent: May 31, 2005

(54) POLARIZED LIGHT SOURCE SYSTEM WITH MIRROR AND POLARIZATION CONVERTER

(75) Inventor: Serge Bierhuizen, Wilsonville, OR (US)

(73) Assignee: InFocus Corporation, Wilsonville, OR (US)

( * ) Notice: Subject to any disclaimer, the term of this patent is extended or adjusted under 35 U.S.C. 154(b) by 104 days.

(21) Appl. No.: 10/150,223

(22) Filed: May 17, 2002

(65) Prior Publication Data

US 2004/0066471 A1 Apr. 8, 2004

(51) Int. Cl.$^7$ ................................................ F21V 9/14
(52) U.S. Cl. .................... 362/19; 362/292; 362/559; 349/9; 349/62; 359/487; 359/495
(58) Field of Search ................................ 362/559, 551, 362/257, 290, 292, 311, 19; 359/483, 485, 487, 494, 495, 496, 618, 629, 636, 638–640; 349/1, 5, 8, 9, 56, 61, 62, 65, 57

(56) References Cited

U.S. PATENT DOCUMENTS

| | | | | |
|---|---|---|---|---|
| 3,808,422 A | * | 4/1974 | Handtmann et al. | 362/19 |
| 3,876,285 A | * | 4/1975 | Schwarzmuller | 362/509 |
| 5,098,184 A | | 3/1992 | van den Brandt et al. | 353/102 |
| 5,327,270 A | | 7/1994 | Miyatake | 349/9 |
| 5,410,370 A | | 4/1995 | Janssen | 348/756 |
| 5,452,128 A | * | 9/1995 | Kimura | 362/19 |
| 5,737,124 A | | 4/1998 | Sarayeddine | 359/487 |
| 5,808,709 A | * | 9/1998 | Davis et al. | 349/65 |
| 5,822,021 A | | 10/1998 | Johnson et al. | 348/742 |
| 5,900,976 A | | 5/1999 | Handschy et al. | 359/495 |
| 5,900,985 A | | 5/1999 | Ho et al. | 359/640 |
| 5,953,083 A | | 9/1999 | Sharp | 349/18 |
| 6,024,451 A | | 2/2000 | De Vaan et al. | 353/20 |
| 6,064,523 A | * | 5/2000 | Budd et al. | 359/485 |
| 6,078,363 A | | 6/2000 | Masuda et al. | 348/752 |
| 6,084,703 A | | 7/2000 | Dewald | 359/290 |
| 6,147,802 A | | 11/2000 | Itoh et al. | 359/500 |
| 6,227,682 B1 | | 5/2001 | Li | 362/302 |
| 6,266,105 B1 | | 7/2001 | Gleckman | 348/743 |
| 6,278,552 B1 | | 8/2001 | Ishihara et al. | 359/619 |
| 6,310,713 B2 | | 10/2001 | Doany et al. | 359/247 |
| 6,331,879 B1 | | 12/2001 | Sawai et al. | 349/9 |
| 6,341,867 B1 | | 1/2002 | Itoh | 353/20 |
| 2001/0008470 A1 | | 7/2001 | Dewald | |
| 2001/0035940 A1 | | 11/2001 | Bierhuizen | |

FOREIGN PATENT DOCUMENTS

EP        1 098 536 A2        5/2001

OTHER PUBLICATIONS

Duelli et al., "Polarization Recovery System based on Light Pipes", 8 pps.
Shimizu, "Invited Paper: Scrolling Color LCOS for HDTV Rear Projection", 2001, pps. 1072–1075.
Moench et al., "Invited Paper: New Developments in Projection Light Sources—Shorter Arcs and Miniaturisation", 2001, pps. 1274–1277.

(Continued)

*Primary Examiner*—Thomas M. Sember
*Assistant Examiner*—Ismael Negron
(74) *Attorney, Agent, or Firm*—Schwabe, Williamson & Wyatt, P.C.

(57) ABSTRACT

A polarized light source for a display system includes an optical system to image light from a light source onto a display along a first optical path, a reflective polarizer to receive the light from the optical system along a first optical path, direct light of a first polarization of the display, and reflect light of a second polarization along a second optical path separate from the first optical path toward the optical system, a mirror in the second optical path to receive light having the second polarization from the reflective polarizer, and reflect it back to the reflective polarizer, and a polarization conversion system in the second optical path between the reflective polarizer and the mirror to convert the polarization of the reflected light of the second polarization to the first polarization.

39 Claims, 5 Drawing Sheets

OTHER PUBLICATIONS

Sharp et al., "High Throughput Color Switch for Sequential Color Projection", 2000, pps. 96–99.

Gardner et al., "New, High Performance, Durable Polarizers for Projection Displays", 2001, pps. 1287–1289.

Bachels et al., "Advanced Electronic Color Switch for Time–Sequential Projection", 2001, pps. 1080–1084.

Dewald et al., "Sequential Color Recapture and Dynamic Filtering: A Method of Scrolling Color", 2001, pps. 1076–1079.

* cited by examiner

POLARIZED LIGHT SOURCE SYSTEM WITH MIRROR AND POLARIZATION CONVERTER

BACKGROUND OF THE INVENTION

1. Field of the Invention

The invention relates generally to the field of polarized light sources, such as polarization conversion systems (PCS) for viewing displays directly or by projection. More particularly, the invention relates to a polarized light source with a reverse optical path to enhance brightness.

2. Description of the Related Art

Many displays used in projection and direct viewing systems operate on the basis of polarization. Such displays include reflective displays such as LCoS (Liquid Crystal on Silicon), super twisted nematic (STN), and ferroelectric (FLC) as well as transmissive displays, such as thin film transistor (TFT), poly-silicon (p-si), and Silicon-on-Insulator (SOI). These displays can produce a high resolution image by changing the polarization state upon reflection or transmission of incident light. In an LCoS display, for example, in the dark state, a pixel reflects all light with substantially no change in polarization. In the bright state, the pixel rotates the polarization state of reflected incident light to the corresponding orthogonal state. By illuminating the display with polarized light and then filtering out nearly all reflected light of that polarization, the display image can be viewed by the human eye or projected onto a viewing screen.

In a single panel projection system, the display is illuminated with short bursts of red, green, and blue light while the display is synchronized to the pulsed light source to reflect the appropriate color component of the image. A white light or other color light burst can also be used alone or in combination with the red, green, and blue light. The short bursts can come from a color wheel or from pulsed LEDs (Light Emitting Diodes). The rapidly alternating red, green, and blue images are blended in human perception to form the full-color image of the display. However, the display can also be illuminated with monochromatic light for data or targeting displays. Such displays are used, for example in helmet, windshield, and visor projection systems as well as in small portable projectors and handsets for private display viewing and for virtual reality systems.

Because most conventional low cost light sources produce light with mixed polarization states, the light is typically analyzed by a PBS (Polarizing Beam Splitter). Light of one polarization direction (usually S-polarization) propagates through the PBS, while light of the orthogonal polarization direction (usually P-polarization) is reflected by the PBS. Another common approach is to use a polarizing filter that absorbs light of one polarization direction. Normally in such systems without a polarization conversion system, half of the light is lost either from reflection or absorption. This results in a dimmer display or requires a brighter light source. In a projector, a dimmer display is more difficult to view, while a brighter light source increases the power consumption and the cost of the projector system. Due to the additional heat typically generated, the brighter light source may require a larger housing to provide enough room for cooling or to accommodate a fan to cool the light source. The fan adds additional cost, power consumption and noise.

In order to increase efficiency, a multi-PBS can be used instead of the simple single PBS. The multi-PBS has a two dimensional array of small polarizing beam splitters and associated lenses. The beam splitters and lenses are precisely aligned so that the output of the multi-PBS is substantially collimated and has a single polarization state. The multi-PBS converts almost all of the input light to the same polarization state. However, it is expensive to produce due to the complex structures required and the precision required to align each of the PBS structures with each lens. The multi-PBS therefore increases the cost of the projection system.

Another disadvantage of the multiple and single PBS systems comes from a difference in the transmissivity over different incident angles in a typical PBS between horizontal and vertical axes. In most cases, the PBS will transmit light received at a greater range of incident angles in one axis than in the other. As a result, the PBS may be more efficient in the vertical direction than in the horizontal direction. The efficiency of the PBS can be increased by spreading the light in that direction, however, the angular intensity distribution for a conventional PCS (polarization conversion system) is point symmetrical around the center.

BRIEF SUMMARY OF THE INVENTION

The present invention provides an enhanced an enhanced polarized light source for a display system. In one embodiment, the invention includes an optical system to image light from a light source onto a display, a reflective polarizer to receive the light from the optical system, direct light of a first polarization to the display, and reflect light of a second polarization toward the light source, a mirror to receive light having the second polarization from the reflective polarizer, and reflect it back to the reflective polarizer, and a polarization conversion system between the reflective polarizer and the mirror to convert the polarization of the reflected light of the second polarization to the first polarization.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

The present invention provides a less expensive and more efficient illumination source for reflective and transmissive displays using a reverse optical path together with a forward optical path. It also provides an intensity pattern that is spread in one direction, further enhancing efficiency through typical reflective polarizer or PBS (polarizing beam splitter) materials. It can be applied as a PCS (polarization conversion system) for a reflective LCD (liquid crystal display) display in a projector system as well as in many other ways. As a result, lower cost at equal or higher system performance in brightness and contrast can be achieved.

Figure 1:
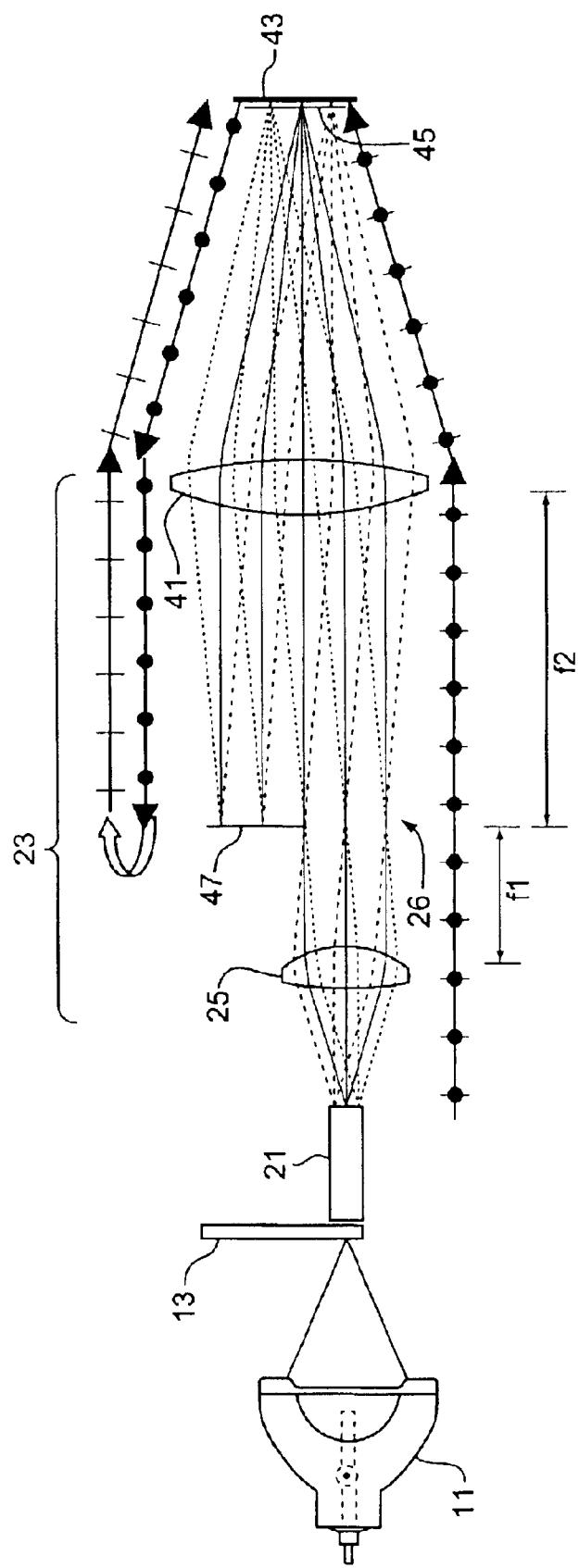
FIG. 1 is a cross-sectional side view diagram of a projector illumination system incorporating one embodiment of the present invention for a transmissive display, including ray tracings for axial and non-axial rays.

An example of one embodiment of the present invention is shown in FIG. 1. The embodiment of FIG. 1 is particularly suitable for a projector using transmissive display such as a liquid crystal display or liquid crystal light valve, however any other reflective or transmissive display can be used with appropriate modifications. In the embodiment of FIG. 1, the illustrated components constitute a back light for the transmissive display. In brief, light from a projector lamp system 11, is filtered by a red, green, blue color wheel 13, and filtered by a reflective polarizer 45 to be incident on a display such as transmissive display 43. In some embodiments, the color wheel may also include a white section or any other color in addition to or instead of the red, green and blue portions. Alternatively, an LED illumination system or any of various other illumination systems can be used. The projector lamp system is a light source for the projector that can take any of a variety of forms depending upon the intended application.

A projector lens (not shown) images the display on a screen (not shown). The images can be still or motion images from any type of image or video medium. The system can be used as a projector for computer generated slides and for digital sourced imagery, however, many other applications such as games, movies, television, advertising and data display can be made. The invention can also be readily adapted to reflective displays as well as for any type of films or plates for which polarized illumination is desired. The system of FIG. 1 is also coupled to various display drivers (not shown). The display drivers receive image or video signals and power and convert the signals into a form suitable for driving the display and the lamp system.

Considering the example of FIG. 1 in more detail, the lamp system 11, and color wheel 13 couple light from the lamp system into a tunnel 21. The tunnel partially collimates the light and gives it a desired cross-sectional shape. A typical tunnel has a rectangular cross-section and is either straight or smaller at its entrance near the light source and larger at its exit, however, any type of light collimation device or light source may be used. For a typical projector, the desired cross-sectional shape is a rectangle designed to accommodate the aspect ratio of the projected images. The images may have an aspect ratio of, for example, 4:3 for computer displays and 16:9 for movie displays. The aspect ratio can be chosen to match that of the display used, such as transmissive dislay 43. Various known techniques can be used to render the projected image in an aspect ratio different from that of the display, if desired.

The lamp system, color wheel, and tunnel may be of a conventional design or any other design depending on the particular application. The color wheel may be replaced with any other type of color selection or modulation system or eliminated if the lamp system is capable of producing light of different colors or if only one color is desired. In one embodiment, the lamp system is a set of red, green and blue LEDs (light emitting diodes) that are pulsed in synchronization with the display to create the different colors that are shown to the viewer. In another embodiment, three different systems one for each color, red, green and blue, with three different displays are provided and the three images are optically combined for viewing. Such systems can use a single lamp with the colors divided up using prisms or dichroic mirrors as is well-known in the art.

Light exiting the tunnel 21 is substantially telecentric due to the design of the light tunnel. Light from the tunnel enters an optical element, such as an imaging lens 25 and then a relay optical system 23 made up of one further optical element, such as second lens 41. As shown in FIG. 1, the relay optical system comprises two optical elements, a first lens, the imaging lens 25 and a second lens 41. These elements can be conventional spherical lenses or any other type of optical element. Various aspheric, diffractive, or Fresnel surfaces can be included as may be desired to achieve cost and size goals for the system. Prisms, mirrors, and additional corrective elements may also be added as appropriate to fold, bend or modify the illumination light for the intended application. The relay optical system is designed to create a telecentric image of the illumination from the lamp system at the display. The imaging lens 25 makes an intermediate image of the lamp system at an intermediate image position 26 between the two lenses 25 and 41. The second lens is a relay system to create the telecentric image of the intermediate image at the display. If a different lamp system or display size are used, then appropriate modifications can be made to the optical system to accommodate the differences.

With the telecentric light source of the present embodiment, the lamp system is assumed to be at infinity. The first optical element, such as imaging lens 25 of the relay optical system has a focal length f1 that equals the distance from its focal plane to the exit aperture end of the tunnel and from its focal plane to the intermediate image position 26. Accordingly, the exit aperture end of the tunnel is imaged at infinity. The light from the lamp system, which is substantially telecentric on exiting the tunnel, is imaged at the intermediate position 26 in the system. As mentioned above, any other source of telecentric or non-telecentric illumination can be used instead of the lamp, color wheel, tunnel system shown in the drawings. The imaging lens 25 can be adapted accordingly to produce a lamp image at the intermediate position depending on the nature of the illumination system. As mentioned above, the imaging lens 25 can be replaced with multiple optical elements of various types, as appropriate. Accordingly, converging and diverging light sources can be used with appropriate adjustments to the optical relay system.

Considering the focal lengths in more detail, the imaging lens 25 has a focal length f1 and is placed at approximately the same distance, f1, from the light tunnel 21. Accordingly, it makes a lamp image and has its exit pupil at the position 26 that is a distance f1 away. The second lens 41 has a focal length of f2 and is placed at that distance, f2, from the intermediate position 26 and from the display. The second lens re-images the pupil from the first lens, i.e. the lamp image at intermediate position 26, at infinity for telecentric illumination at the display panel. It also images the output end of the tunnel at the position of the display panel.

As can be seen in FIG. 1, the first lens is centered on the tunnel. In other words, the optical axis of the imaging lens is aligned with the center of the tunnel, however, other configurations are possible. The second lens 41 is de-centered with respect to the tunnel and light source. This causes the illumination at the display panel to be off-axis, filling half the system's étendue. The second lens is decentered so far that its optical axis is near the edge of or completely outside of the optical path of the image of the lamp system. This de-centering allows for the reverse optical path described below. The second lens is, however, roughly centered about the display as is shown in FIG. 1. This means that the light from the lamp system arrives at the first lens decentered with respect to the display but the second lens centers the image of the light on the display.

The lenses need not be exactly centered with respect to the tunnel or the display, as shown in the figures. Each one can be moved slightly if the other is decentered. In addition, if the reflective polarizer is placed at an angle then the second lens can be moved accordingly. The placement of the lenses in the illustrated embodiment has been selected to minimize the dimensions of the optical system. If the first lens is shifted, or if the reflective polarizer or mirror is placed at an angle, some dimensions may be increased, however, the elements can be moved in a variety of different ways to meet particular size and form factor constraints.

The reflective polarizer 45, for example, a PBS such as a wire-grid polarizer, a cholesteric polarizer, a polymer film stack or a dielectric coating stack, transmits one polarization state, P-polarization, and reflects the other, S-polarization. A suitable wire grid polarizer that can be used as the PBS in place of a typical anisotropic-isotropic polymer film stack is described, for example, in U.S. Pat. No. 6,122,103 to Perkins et al. A suitable wire grid polarizer is the ProFlux™ polarizer, available from Moxtek of Utah in the United States.

The light from the transmitted P-polarization state is imaged by the second lens 41 onto the transmissive display 43. From there it can be re-imaged for viewing by projection or viewing optics. The light from the reflected S-polarization state is imaged by the second lens 41 onto a mirror 47 with a quarter-wave film or coating at the position 26 of the lamp image. The polarization direction is rotated at the mirror and the 'window' is re-imaged back onto the PBS which will now transmit the recovered polarization state, thereby filling the Other half of the system's étendue. The quarter-wave plate or some other polarization conversion device may be placed anywhere between the mirror and the reflective polarizer. The system can include a polarizing analyzer behind the display (not shown), such as an iodine-based PVA (poly-vinyl alcohol) film, or a wire grid polarizer to filter out any stray P-polarized light, enhancing contrast. Analyzers and polarizing filters can also be placed in other locations of the system as may be appropriate for a particular application or lamp system.

In the illustrated embodiment P-polarized light direct from the lamp is imaged over the entire surface of the display, just as the polarization converted light from the quarter-wave plate is. The illumination from the upper reverse path is superimposed over the lower path to increase the display brightness. As an alternative, this light can be used to increase the area that is illuminated. For example, the forward lower path illumination can be imaged onto a first portion of the display and the reflected upper path can be imaged onto a second portion of the display. This can be done through adjustments in the mirror and lens positioning.

The path of the S-polarized component of the light is indicated schematically in FIG. 1. The S-polarization state is shown as dots, suggesting a polarization vector normal to the plane of the drawing sheet. The S-polarized light, as shown by the row of dots below the optical system travels from the tunnel through the first and second lenses to the reflective polarizer. From there it is reflected through the second lens, as shown by the row of dots above the optical system, to the mirror 47. Upon reflection, it is rotated to the P-polarization state, indicated as short lines. The lines suggest a polarization vector that is vertically aligned in the plane of the drawing sheet. The P-polarization as shown by the row of lines passes through the second lens back to the polarizing reflector, where it is allowed to pass and is then incident on the transmissive display 43. As can be seen from the drawing, all of the light impinging upon the display will be P-polarized and almost all of the illumination that passes through the color wheel will impinge upon the display. The only losses are in the natural imperfections of the components, such as absorption in the mirror and lenses, losses in the tunnel and polarizers, etc. The system provides exceptional efficiency in a very compact and inexpensive package.

Light for dark portions of the display will either be absorbed in the display or reflected from the display back into the optical system, depending on the design of the display. If it is reflected back with no change in polarization, as P-polarized light, it will be passed through the reflective polarizer 45 back toward the mirror 47 and lamp system 11. If it is reflected toward the mirror then it will be converted to S-polarization by the quarter-wave plate, be reflected off the reflective polarizer and converted by the quarter-wave plate back to P-polarization to illuminate the display. The light that is reflected toward the lamp may be recovered through the lamp optical system depending on the design of the lamp. In the example of the present embodiment this light will probably be largely recovered as well further enhancing the brightness of the display. Alternatively, absorbing polarizers, such as dichroic filters can be placed at appropriate locations to absorb this back-reflected light. Except for losses and scattering in the mirrors, lenses and other components, the intensity of the illumination on the display is doubled as compared to many systems without the cost of a multi-PBS system.

In addition, in the illustrated embodiment, the mirror is positioned so that the optical path length from the lamp system to the display through the mirror is twice the optical path length from the lamp system directly to the display. The exact position of the lamp system is somewhat imprecise. It can be measured as the image of the exit pupil of the light source. In the illustrated embodiments, the lamp can be considered as being located near the exit pupil of the light tunnel, i.e. the end of the light tunnel closest to the relay optical system. The optical components can be positioned so that the optical path lengths differ by any integer multiple other than two. This ensures that the light reflected off the mirror and quarter-wave plate is also imaged on the display. When this light is combined with the light that travels the direct path from the lamp system to the display, a brighter, sharper image results.

At the display, the angular intensity distribution, i.e. the anglar spread or the light transmission as a function of the incident angle, e.g. azimuth θ and polar angle Φ, of the light produced by the lamp system into the entrance pupil of the projection lens will look like two elongated hot spots one above the other. The lower hot spot will come from the lower optical path direct from the lamp system. The upper hot spot comes from the upper optical path reflected from the quarter-wave plate. The light intensity is spread over the horizontal about the two vertically aligned spots (a horizontal line can be regarded as a line going through the plane of the page in the figures, while a vertical line is a vertical line in the figures). The two hot spots correspond to a central area with an average incident angle close to perpendicular to the display. The average angle of the incident light diverges steadily from the perpendicular with distance from the center. A conventional system might produce a central circular hot spot of angular intensity distribution rather than the two spread elliptical hot spots of the illustrated embodiment. If the reflective polarizer is properly selected and positioned, this elliptical spreading property of the illumination can be exploited to improve the efficiency of the reflective polarizer.

Many types of reflective polarizers and polarizing beam splitters (PBS) have an angular dependence on transmissivity that differs between orthogonal axes. In one axis, e.g. the horizontal, a greater range of incident light angles will be transmitted than in the other orthogonal axis, e.g. the vertical. A dichroic PBS prism, a wire grid polarizer, cholesteric reflective polarizer and some PBS film stacks all show this property. By spreading the angular intensity of the light in the horizontal axis as the configuration of FIG. 1 does, more light will be transmitted through the polarizer than if the angular intensity were symmetrically diminishing around a central point. This property can be exploited by properly positioning the polarizing materials so that the axis of the greater angular transmission characteristic or the greater angular acceptance is aligned with the angular intensity distribution of the illumination. Stated another way, the transmissivity of the system is improved by matching the direction of elongation of the hot spots to the direction of the high contrast isocontrast curve of the particular polarizer. The increased efficiency will be accompanied by a commensurate increase in brightness and contrast.

Figure 2:
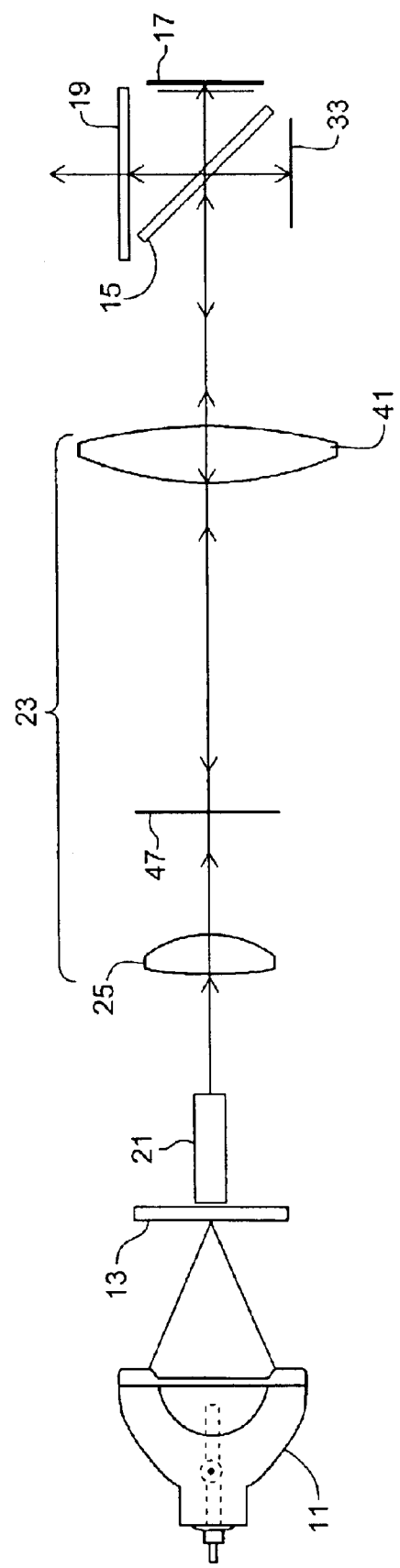
FIG. 2 is a cross-sectional top view diagram of a projector illumination system incorporating a second embodiment of the present invention for a reflective display, showing a central ray.

The same polarization recovery system can also be applied for a single panel reflective system, by using, for example, a display 17 such as an LCOS or STN display panel and a reflective wire grid PBS 15, as is shown in FIG. 2. FIG. 2 shows the system from a top cross-sectional view as compared to the view of FIG. 1. In FIG. 2, the light, from any of a variety of different light sources such as lamp system 11, is split at the PBS into S- and P-polarized light. The PBS can be a prism, beam splitting cube, wire grid, or film. A variety of different known beam splitting devices can be used, such as a cholesteric polarizer, polymer film stack or dielectric coating stack at the diagonal beam splitting surface. A wire grid polarizer can be used as the PBS in place of a typical anisotropic-isotropic polymer film stack. In the illustrated embodiment, the PBS is configured with a geometry similar to a conventional beam-splitting cube, in which the PBS is at a 45 degree angle to the display and the light propagating from the lamp. Other geometries can be selected to meet packaging and price considerations.

The S-polarized light from the lamp that is reflected off the PBS is reflected by a mirror 33 or a second reflective polarizer back to the reflective PBS 15 and then back toward the second lens 41. The second lens directs this light to the mirror 47 which includes the quarter-wave plate film. As with the embodiment of FIG. 1, the S-polarized light is converted to P-polarization and reflected back toward the PBS. This time, the PBS transmits it through to the display 17. Additional analyzers can be added to improve the contrast by absorbing the light imperfectly filtered through or off the PBS.

In the embodiment of FIG. 2, the same PBS is used for polarization conversion and for imaging, which reduces the cost. The wire-grid polarizer can be replaced by an imaging PBS prism or any other type of PBS. The same principles of imaging the lamp image at the display of FIG. 1 are maintained by placing the mirror at the same distance as the display. This provides that the lamp image is imaged at the mirror and at the quarter-wave plate. This system will also produce the two horizontally spread intensity hot spots discussed above. The horizontal spreading can be exploited to improve brightness and contrast of the viewed image as discussed above.

Figure 3:
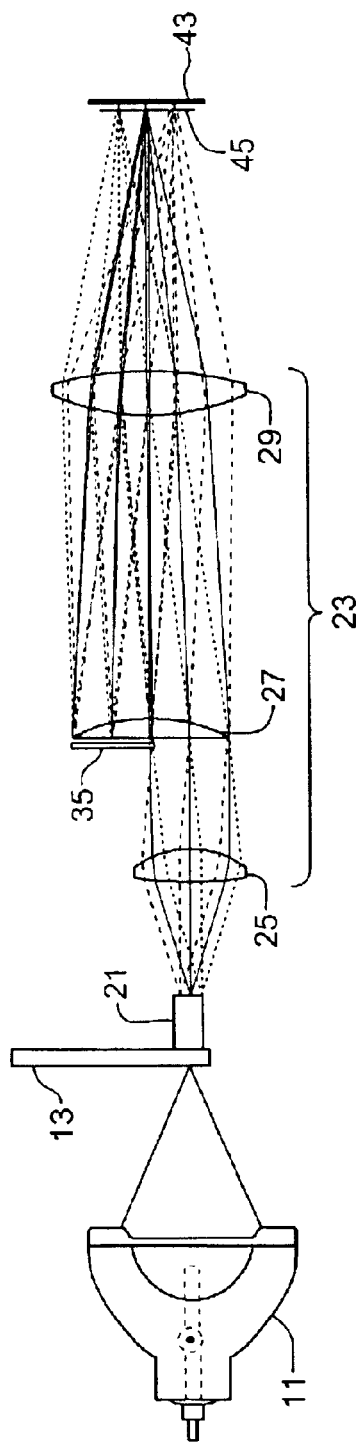
FIG. 3 is a cross-sectional side view diagram of a projector illumination system incorporating a third embodiment of the present invention for a transmissive display, including ray tracings for axial and non-axial rays.

FIG. 3 shows another embodiment for use with a transmissive display such as a liquid crystal display, however any other transmissive display can be used. In the embodiment of FIG. 3, the relay lens system 23 is composed of two lenses 27, 29. The additional lens is located at the intermediate image position 26. This is the focal point of the imaging lens 25 as shown in FIGS. 1 and 2. As in FIG. 1, light from a projector lamp system 11, is filtered by a red, green, blue col wheel 13, and filtered by a reflective polarizer 45 to be incident on a transmissive display 43. The P-polarized light incident on the display is reflected from the display as S-polarized light, reflected off the other side of the polarizer and into a projector lens (not shown). The projector lens images the display on a screen (not shown).

Light from the tunnel is imaged by the first lens into the relay optical at system 23. These elements can be conventional spherical lenses or any other types of optical elements. The imaging lens 25 makes an intermediate image of the lamp system at the second lens 27. The second and third lenses constitute relay system to create the telecentric image of the intermediate image at the display. With the telecentric light source of the present embodiment, the light on the first element such as imaging lens 25, will be telecentric. In the embodiment of FIG. 3, the first element has a focal length that equals the distance to the tunnel. Accordingly, the tunnel is imaged at infinity but the lamp is imaged at the second optical element 27.

As with FIG. 1, the first lens is centered on the tunnel to produce the image on the second lens. The relay lens group 27, 29 can be decentered with respect to the lamp system, the tunnel, and the first lens. This de-centering allows for a reverse optical path like that of FIGS. 1 and 2. The relay lens group is, however, roughly centered about the display, so that the light from the lamp system arrives at the first lens decentered with respect to the display but the relay group centers the image of the light on the display.

As with the embodiments described above, since the relay system is offset (decentered) with respect to the tunnel and the imaging lens 25, the light from these lenses is formed into a half cone of light with respect to the relay lenses. The light from the lamp to the display travels through what is shown in FIG. 3 as the lower half of the relay lenses. The light reflected by the polarizer 45 travels toward the upper half of the two relay lenses 27, 29. Directly after the two relay lenses, there is a second mirror 35 that reflects the light back toward the PBS's. The second mirror has a quarter-wave plate that rotates the polarization direction. This mirror can be a separate component behind the relay lens or it can be a silver coating applied directly to the relay lens. In the illustrated embodiment, the relay lens is a plano-convex lens with its curved surface facing the display. As a result, the flat, planar surface can be coated to produce the mirror.

Applying the mirror as a coating reduces the parts count and assembly cost of the final product. The quarter-wave plate can be produced as a coating on the mirror, on the relay lens, or as a separate component, the quarter-wave plate can be positioned anywhere between the mirror and the first PBS. Alternatively, any other polarization conversion device can be substituted for the quarter-wave plate.

The reflected S-polarized light is then converted by the quarter-wave plate to P-polarized light which, after passing back through the relay lenses, will therefore pass through to the display. This allows all of the reflected S-polarized light to be recovered and imaged onto the display 17. The light will show horizontal spreading in a manner very similar to that of FIGS. 1 and 2 and most of the reflected S-polarized light from the reflective polarizer will be rotated and recovered.

Figure 4:
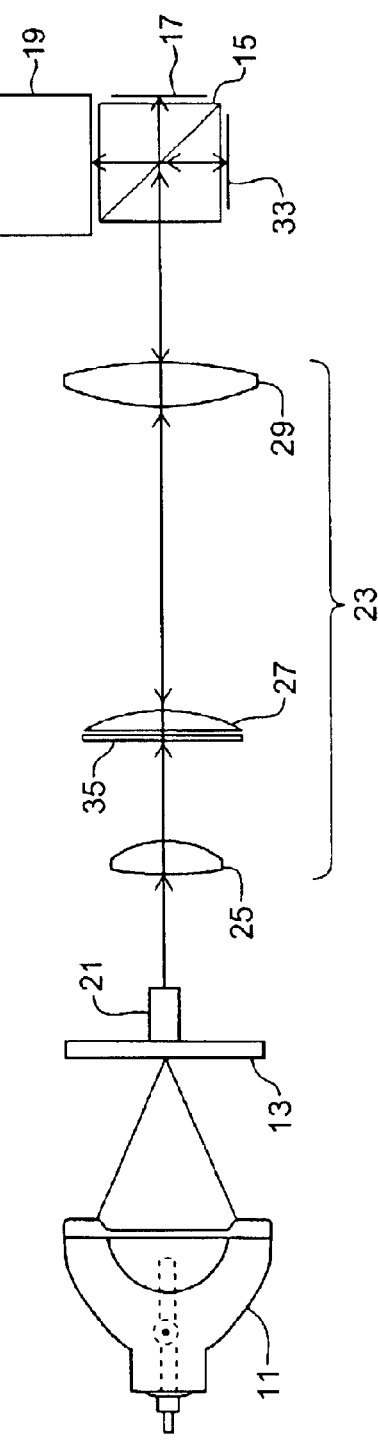
FIG. 4 is a cross-sectional top view diagram of a projector illumination system incorporating a fourth embodiment of the present invention for a reflective display, showing a central ray.

FIG. 4 shows an embodiment of the invention that is very similar to that of FIG. 3 except that it has been adapted for use with a reflective display using a PBS. The view is a top cross-sectional view to show the PBS more clearly. As with the embodiment of FIG. 2, the PBS can take any of a wide variety of different forms. Many of the same components discussed above are used in the same configuration and will not be discussed further.

In operation, as shown by the central ray traced in FIG. 4, light from the color wheel and tunnel is incident on the imaging system, which in this case is made up of a single lens, such as imaging lens 25. The imaging system makes an intermediate lamp image at the position of the first lens 27 of the optical relay system 23. From there it is relayed through the bottom half of the relay lenses 27, 29 to the display. Before hitting the display, it strikes the PBS 15. P-polarized light is passed to be imaged on the display. The light reflected from the display as an S-polarized image is reflected from the PBS to the projector optics 19. The P-polarized light reflected from the display is reflected back through the PBS toward the lamp for possible recovery. S-polarized light is reflected from the PBS to the mirror 33 back to the PBS and then to the upper half of the de-centered relay lenses. The second mirror and quarter-wave plate reflect this S-polarized light as P-polarized light back through the relay lenses to the PBS where it is passed to the display.

This system will also recover a significant portion of the rejected polarization and produce the two horizontally spread angular intensity hot spots discussed above. The horizontal spreading of the angular intensity can be exploited to improve brightness and contrast of the viewed image as discussed above. Horizontal and vertical are used in the present description to aid in understanding and convenience. The designation of particular axes can be adapted to suit any particular application and need not be Cartesian or orthogonal. Diagonal and polar directions can also be used to spread the light's angular intensity distribution so as to increase transmission.

Figure 5:
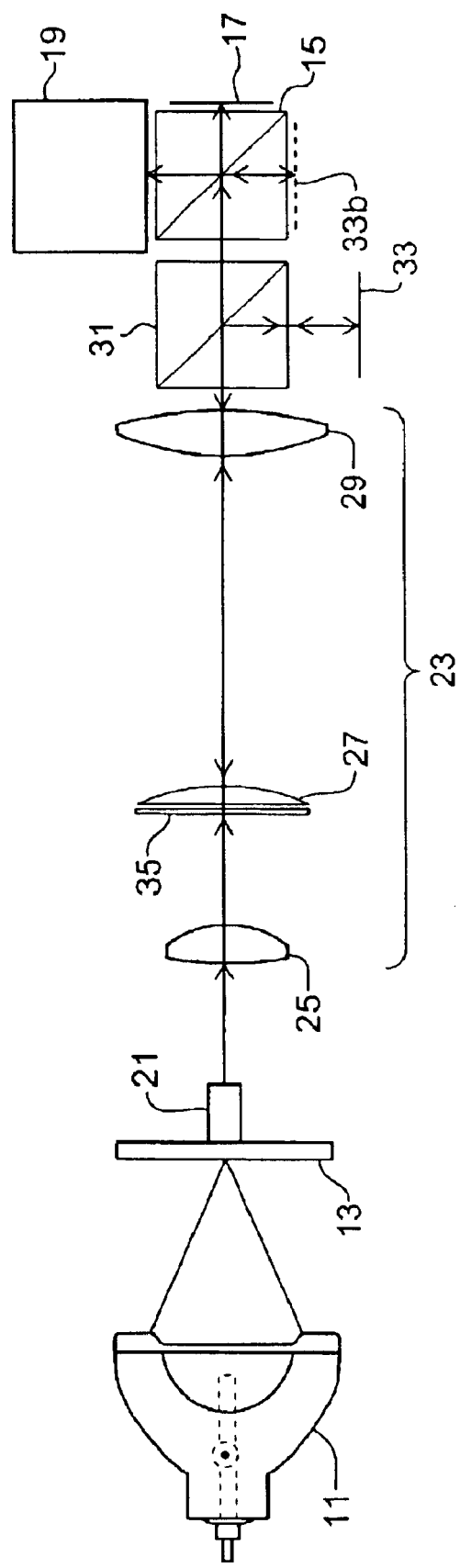
FIG. 5 is a cross-sectional top view diagram of a projector illumination system incorporating a fifth embodiment of the present invention for a reflective display similar to that of FIG. 4 but including two polarizing beam splitters.

A further example embodiment of the present invention is shown in FIG. 5. The embodiment of FIG. 5 is also suitable for a projector using a reflective display such as an LCoS or STN display, however any other reflective or transmissive display can be used. The primary difference between the embodiment of FIG. 4 and that of FIG. 5 is the addition of another PBS 31 and the movement of the mirror 33 to be aligned with the additional PBS 31. This increases the contrast of the system while adding to its cost and size. Polarizing beam splitters are not perfect in operation and while almost all of the S-polarized light will be reflected by a PBS, some will be transmitted and some P-polarized light will be reflected. In the embodiment of FIG. 5, the illumination is passed through two PBS's to help enhance contrast. After both passes, a smaller amount of S-polarized light will be incident on the display. As with the other embodiments, additional analyzers may be used to enhance contrast still further such as the one discussed above for the projector optics 19. The analyzers can be absorption polarizers or wire-grid polarizers, for example, or any other suitable type of polarization analyzer.

The pair of PBS's 31, 15 is placed between the relay optical system and the display. However, as shown in FIG. 4, a system can also be made with one PBS or with no PBS as shown in FIG. 3. The first PBS 31 receives light from the relay optical system 23, reflects the S-Polarized component of the light from the lamp system, and passes the P-polarized component. The P-polarized component will propagate to the second PBS 15. The second PBS will also pass the P-polarized component of the light on to the display 17. As with the other embodiments above, the light from the end of the light tunnel will be imaged on the display 17 by the relay optical system. At the display, light for bright portions of the display image will be rotated in polarization to S-polarized light and reflected from the display back to the second PBS 15. The second PBS is placed at an angle to the display and the incident light from the relay optical system. While this will not impact the direction of light that passes through the second PBS, it will change the direction of reflected light.

Viewing optics 19 are placed in a location to receive light reflected from the PBS. In the embodiment of FIG. 5, the viewing optics are perpendicular to the display. As a result, from the second PBS, light from the display which constitutes the image to be viewed will be reflected to the viewing optics 19. In one embodiment, the viewing optics are a projector lens system to project the image onto a screen. In another embodiment, the viewing optics are a viewing screen with magnifying optics. The viewing optics can include a polarizing analyzer, such as an iodine-based PVA (poly-vinyl alcohol) film, or a wire grid polarizer (not shown) to filter out any stray P-polarized light, enhancing contrast. Analyzers and polarizing filters can also be placed in other locations of the system as may be appropriate for a particular application or lamp system.

Light for dark portions of the display will be reflected from the display with no change in polarization, as P-polarized light. This will be passed through both PBS's back toward the lamp system 11. A portion of this light will be recovered in the system and reflected back toward the display. The particular display and projector optics configuration shown in the figures is shown as an example only, the present invention can also be applied to transmissive displays and other types of display and viewing configurations.

As mentioned above, the S-polarized light incident on the first PBS 31 will be reflected. However, since the PBS is not perfect a small amount of S-polarized light will also be passed through to the second PBS 15. Almost all of this remaining S-polarized light will be reflected by the second PBS. Since this PBS is at an angle to the direction of the propagation of the light, it will be reflected out of the optical path of the system. It can then be leaked out of the system or absorbed into a housing (not shown) that is constructed to absorb any stray light. Alternatively, a second mirror 33b can be added below the second PBS to reflect light reflected from the second PBS back into the system. Either of these mirrors can be supplemented with, for example a quarter-wave plate or a wire grid polarizer to correct the polarization of the reflected light.

The first PBS 31 is oriented parallel to the second PBS 15, although it could also be oriented orthogonal to the second PBS with no impact on other components. As a result, the reflected S-polarized light is directed out of the optical path of the lamp and the display to a mirror 33. The mirror is positioned parallel to the optical axis of the relay optical system, so that light reflected from the first PBS is reflected to the mirror and from the mirror is reflected with no significant change in polarization back to the first PBS. From the first PBS it is reflected back to the relay optical system, toward the lamp.

Using the reverse optical path described with respect to the other embodiments, the light reflected by the mirror 33 and first PBS 31 travels a reverse path toward the second mirror and quarter-wave plate 35 that reflects the light back toward the PBS's. The reflected S-polarized light is converted by the quarter-wave plate to P-polarized light which, after passing back through the relay lenses, will therefore pass through the PBS's to the display. This allows almost all of the reflected S-polarized light to be recovered and imaged onto the display 17.

In the illustrated embodiment, the first and second mirrors are positioned so that the optical path length from the lamp system to the display through the second mirror is twice the optical path length from the lamp system directly to the display. In effect, the additional PBS is placed between the relay lens 29 and the single PBS as shown in FIG. 4.

The angular intensity distribution as well as the overall brightness of the system can be enhanced still further by careful design of the light tunnel, although the example embodiments of the invention described above provide benefits when used with any type of light source. A rectangular tunnel can be tapered on one pair of opposing sides from a square or rectangular cross-section at the entrance end to a square or rectangular cross-section (e.g. 4:3 or 16:9) at the exit end. The taper can be designed so that the exit end is larger. This can be used to reduce the exit angle of light from the tunnel. Alternatively, the tunnel can be tapered so that the entrance end is larger. This increases the exit angle of the light from the tunnel. The particular choice will depend on the light source and the optical system for relaying light to the display. In either case, adding an appropriate taper allows the tunnel to fill the projection lens pupil more efficiently. This also makes the lamp image elliptical and increases the pupil fill factor and light collection for a given F number.

Figure 6:
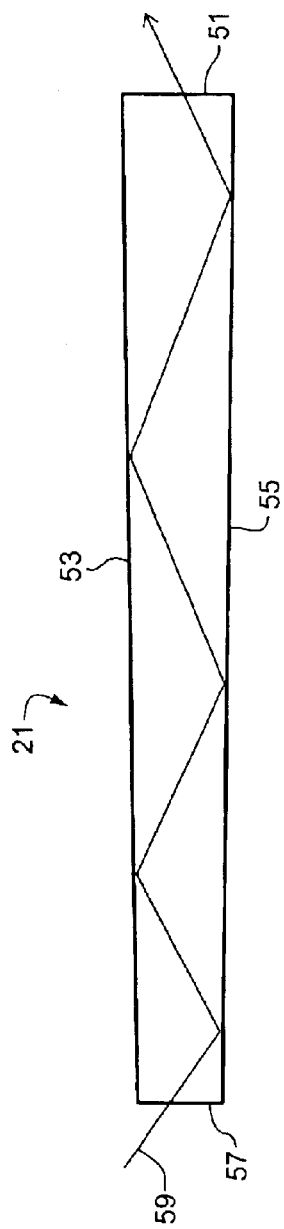
FIG. 6 is a cross-sectional view of a tapered light integrator tunnel suitable for use with the present invention showing the path of edge rays.

In one example, as shown in FIG. 6, a 50 mm long hollow tunnel 21 has an exit aperture 51 of 5.75 mm×3.24 mm for a 16:9 aspect ratio; The tunnel can be made from any solid material that can be formed with the appropriate shape, so that light propagating through the tube or tunnel is propagating through the ambient, through air, or through a selected gas. By tapering two opposing side walls 53, 57 of the tunnel each by about one degree, two degrees for both sides, the entrance aperture 57 can be made to be 4 mm×3.24 mm. Alternatively, the tunnel can be a solid tunnel made from any optically transparent material including acrylics, polycarbonates and other plastics. If the tunnel is to preserve polarization states, then a low birefringence material can be selected.

As a result, if light has an input cone angle of 30 degrees, the angle at each reflection off a tapered side wall will be reduced by two degrees. Tracing a 30 degree edge ray 59, shows that there will be five bounces, so the exit angle is reduced by 20 degrees, a change of ten degrees In one example, light is reflected off the walls of a solid glass rod due to total internal reflection. If the incident angles for the light are higher, then the rod can have a mirror coating along its length. Other phase and anti-reflection coatings can also be used. A hollow tunnel can be made using a reflective surface on the interior walls.

The other two opposing sides, not visible in the cross-sectional view of FIG. 5, are not tapered in this example. By tapering only one pair of side walls, the angular intensity is made to be elliptical. The exit cone angle in the tapered direction is reduced to 20 degrees, while the exit cone angle in the straight direction is the same as the input cone angle, 30 degrees. The elliptical angular intensity can be exploited, as described above, to improve the efficiency of any polarizing reflector in the system.

Applying these principles, the length of the integrator tunnel and the amount of taper on each side can be varied to accommodate any desired entrance and exit cone angle and any desired entrance and exit aperture size. For example, if the two side walls are angled at two degrees instead of one, then the exit cone angle is reduced by four degrees on each bounce. Changing the tunnel length controls how many bounces occur. Changing the relative amount of taper on the two walls, changes the ellipticity of the angular intensity distribution at the exit aperture. Similarly, the taper can be reversed so that the entrance aperture is larger than the exit aperture. This reduces the angle of acceptance at the entrance aperture and increases the exit cone angle relative to the entrance cone aperture.

The side walls of the tunnel can have different or opposite tapers and the tunnel can be constructed with more or fewer side walls. In other words, while the cross-section of the tunnel, taken through the page as shown in FIG. 5, is a rectangle at every point along the tunnel, this shape can instead be a polygon with any number of sides or rounded, such as a circle or ellipse. The optimal shape will depend upon the shape of the display and the relay optical system to transfer light from the tunnel to the display. For rectangular displays, the rectangular cross-section shown and described has been found to be compact and efficient but other configurations can be used.

An alternative tunnel shape can be designed by curving the sides in a parabolic shape using principles from a CPC (Compound Parabolic Concentrator). CPC's have been used in solar collector arrays and also in some illumination optics. The CPC provides a good transformation from the ingoing beam to the outgoing beam without a loss in étendue. A CPC can be designed to follow the following relationship, $\sin \theta_1 D_1 = \sin \theta_2 D_2$, where $\theta_1$ and $\theta_2$ are the entrance and exit cone angles of the tunnel respectively, and $D_1$ and $D_2$ are the heights of the entrance and exit apertures.

Figure 7:
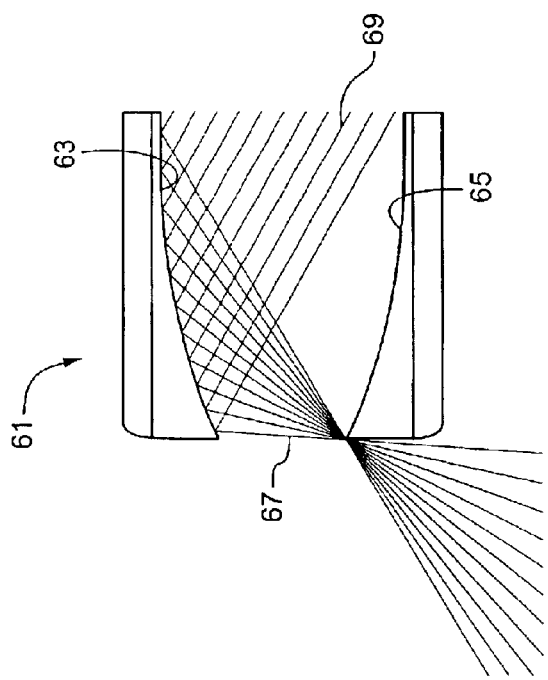
FIG. 7 is a cross sectional view of a tapered light integrator tunnel shaped as a compound parabolic concentrator suitable for use with the present invention.

Referring to FIG. 7, a CPC-based tunnel 61 is shown in a cross-sectional view. The CPC surface is shown applied to the opposing parabola-shaped interior top 63 and bottom 65 side walls. As with the embodiment of FIG. 6, the tunnel of FIG. 7 has a rectangular cross-section taken through the page. Similar approaches can also be applied to the side walls or any other walls, in the event that a rounded tunnel is used or a tunnel with a cross-sectional shape other than a rectangle. FIG. 7 shows a simplified version of a tunnel with an input aperture $D_1$ 67 of 1 and an input angle $\theta_1$ of 90 degrees. The exit aperture $D_2$ 69 has been selected as 2 so the corresponding output cone angle $\theta_2$ is 30 degrees. As can be seen from this example, the CPC can effectively reduce extreme (90 degrees) input angles in a very compact size.

In another embodiment, the proportions used above for the straight sided tapered tunnel can be used. In that example, the input aperture was 4 mm×3.24 mm and the exit aperture was 5.75 mm×3.24 mm. To achieve a 20 degree exit cone angle, the input cone angle can be determined from sin $\theta_1$=sin $\theta_2$ ($D_2/D_1$). In this case, the CPC can accept a 30 degree input cone angle. Thus, the CPC-based tunnel can produce results similar to the straight sided tunnel in a smaller package that preserves étendue.

Either type of tapered tunnel design can be used, not only to control the angular intensity distribution of the light exiting the tunnel, but also to change the aspect ratio from input to output. If, for example, a square light source is used to illuminate a rectangular display (e.g. 4:3 or 16:9) then the tunnel can be tapered in the horizontal direction (as displayed to a viewer). This will result also in a spreading of the angular intensity in the horizontal direction. The horizontal spreading will enhance the transmittance and reflectance of any polarizers in the system as described above, resulting in a more efficient illumination system. Light sources with rectangular output and large angular distributions are readily available, enhancing the value of the tapered tunnel.

Another advantage to the tapered tunnel is that it makes the pupil of the lamp system elliptical. This helps to better fill the round pupil of a projection or viewing lens when the illumination system uses two paths as in the embodiments described above. In order to further enhance the benefits of the elliptical pupil, a lamp system that produces an elliptical pupil can be used. Many conventional lamp systems can be adapted to this purpose.

One such elliptical lamp system that is particularly efficient for systems with a small étendue is shown, for example in U.S. Pat. No. 6,227,682 to Li. This lamp uses dual parabolic reflectors to re-image the arc light source at a definite position with an angular spread of 90 degrees in one direction and 45 degrees in the other. The difference in angular spread, normally considered a disadvantage, enhances the integration and uniformity of the resultant beam when the light is first coupled into a wedge-shaped tunnel. It can be simplified further using a reflective coating on the arc burner instead of a bottom reflector. This reduces the number of reflections and renders the lamp more compact.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in diagram form. The specific details may be supplied by one of average skill in the art as appropriate for any particular implementation.

Importantly, while embodiments of the present invention are described with reference to a video projector, the apparatus described herein are equally applicable to any type of illumination system for a polarization-based display, whether for projection or direct viewing, whether compact or not. For example, the techniques described herein are thought to be useful in connection with computer and data device displays, television and movie projectors, internet appliance viewers, and entertainment systems for video and game players.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A polarized light source system comprising:
   an optical system to image light from a light source along a first optical path onto a display;
   a reflective polarizer to receive the light from the optical system along the first optical path, direct light of a first polarization to the display, and reflect light of a second polarization along a second optical path separate from the first optical path toward the optical system;
   a mirror in the second optical path to receive light having the second polarization from the reflective polarizer, and reflect it back to the reflective polarizer; and
   a polarization conversion system in the second optical path between the reflective polarizer and the mirror to convert the polarization of the reflected light of the second polarization to the first polarization.

2. The system of claim 1, wherein the polarization conversion system comprises a mirror coating.

3. The system of claim 1, wherein the mirror is formed by a coating on a portion of an optical element of the relay optical system.

4. The system of claim 1, wherein the optical system comprises a set of relay optical elements to image the light from the light source onto the display, wherein the light source is on one side of the optical axis of the relay optical elements, wherein the mirror is on the other side of the optical axis from the light source, and wherein the mirror comprises a coating applied to an element of the set of relay optical elements.

5. The system of claim 1, further comprising a second reflective polarizer to receive the light from the reflective polarizer, direct that portion of the received light having the first polarization to the display and reflect the portion of the received light having the second polarization from the display.

6. The system of claim 1, wherein the reflective polarizer comprises a polarizing beam splitter.

7. The system of claim 1, wherein the reflective polarizer comprises a cholesteric polarizer.

8. The system of claim 1, wherein the light from the optical system has an elongated hot spot, wherein the light from the mirror has a second elongated hot spot and wherein the reflective polarizer is oriented based on the direction of elongation of the hot spots.

9. The system of claim 1, wherein the reflective polarizer has an axis of greater acceptance and wherein the axis of greater acceptance is aligned with the intensity distribution of the illumination impinging on the reflective polarizer from the lamp and the mirror.

10. The system of claim 1, further comprising a second mirror positioned to receive reflected light from the reflective polarizer and reflect it back to the reflective polarizer.

11. The system of claim 10, wherein the optical path length from the light source to the display through the first mirror and the second mirror is an integer multiple of the optical path length from the light source to the display.

12. The system of claim 1, wherein the light source comprises a lamp and an elongated light conductor; the light conductor having an entrance aperture at one end of the conductor to receive light from a light source and an exit aperture at another end of the conductor opposite the entrance aperture to allow light entering at the entrance aperture to exit at the exit aperture, the exit aperture being of a different size than the entrance aperture, the elongated light conductor including reflective interior side walls between the entrance aperture and the exit aperture, the side walls being angled in proportion to the relative sizes of the entrance and exit apertures.

13. The system of claim 12, wherein the light conductor has a rectangular cross-section between the entrance aperture and the exit aperture and wherein the reflective interior side walls comprise two opposing tapered side walls.

14. The system of claim 12, wherein the light conductor has a rectangular cross section at the entrance aperture and the exit aperture, wherein the reflective interior side walls define a rectangle, and wherein two opposing interior side walls are angled to meet at the edges of the entrance aperture at one end and at the edges of the exit aperture at the other end.

15. The system of claim 12, wherein the relative size of the entrance aperture and the exit aperture of the light conductor are selected to meet an entrance and exit angle criterion.

16. The system of claim 12, wherein the elongated light conductor comprises an optically transparent solid rod and wherein the interior side walls comprise external boundaries of the solid rod.

17. The system of claim 12, wherein the interior side walls of the conductor include curved parabolic surfaces between the entrance and exit apertures.

18. The integrator of claim 17, wherein the elongated light conductor is configured as a compound parabolic concentrator.

19. The system of claim 1, wherein the optical system comprises a relay optical system to image the light from the light source onto the display.

20. The system of claim 19, wherein the relay optical system is decentered with respect to the light source and centered with respect to the display.

21. The system of claim 20, wherein the relay optical system is decentered with respect to the mirror and the mirror is on a side of the optical axis of the relay optical system opposite from the light source.

22. The system of claim 21, wherein the optical path length from the light source to the display through the mirror is an integer multiple of the optical path length from the light source to the display.

23. A polarized light source system comprising:
 a light source to produce light having multiple polarization states, the light source comprising a lamp and a tunnel, the tunnel being configured to produce a cone of light having an aspect ratio corresponding to a display;
 an optical system to image the light from the light source onto the display, the optical system having an optical axis on one side of the light source and being centered with respect to the display;
 a reflective polarizer to receive the light from the optical system, direct light having a first polarization to the display and reflect light having a second polarization to the optical system;
 a mirror on the side of the optical axis of the optical system that is opposite the light source to receive light having the second polarization from the reflective polarizer and reflect it back to the reflective polarizer,
 a quarter-wave plate between the mirror and the reflective polarizer to convert the polarization of the light reflected from the reflective polarizer to the second polarization,
 wherein the optical path length from the light source to the display through the mirror is an integer multiple of the optical path length from the light source to the display directly.

24. The system of claim 23 wherein the reflective polarizer is angled with respect to the optical axis of incident light from the optical system, the polarized light source system further comprising a second mirror positioned to receive light having the second polarization from the polarizing beam splitter and reflect it back to the polarizing beam splitter for reflection toward the mirror.

25. The system of claim 23, wherein the quarter-wave plate comprises a coating on the mirror.

26. The system of claim 23, wherein the mirror comprises a reflective coating on a powered optical element, the powered optical element also forming a portion of the relay optical system.

27. The system of claim 23, wherein the optical system comprises a set of relay optical elements to image the light from the light source onto the display.

28. The system of claim 27, wherein the relay optical elements are decentered with respect to the mirror and the mirror is on a side of the optical axis of the relay optical elements opposite from the light source.

29. The system of claim 28, wherein the optical path length from the display to the mirror is an integer multiple of the optical path length from the light source to the display.

30. A method of generating polarized light for display comprising:
 receiving light having multiple polarization states;
 imaging the received light onto the display along a first optical path;
 directing at a reflective polarizer along the first optical path the portion of the imaged light having a first polarization to the display, and reflecting at the reflective polarizer along the second optical path separate from the first optical path the portion of the imaged light having a second polarization;
 reflecting the reflected imaged light back to the display along the second optical path; and
 converting within the second optical path the polarization of the reflected light of the second polarization to the first polarization.

31. The method of claim 30, further comprising receiving reflected light from the reflective polarizer and reflecting it back to the reflective polarizer before reflecting it towards the light source.

32. The method of claim 30, wherein reflecting the imaged light toward the light source comprises reflecting the imaged light along a path parallel to and offset from the path of the imaged light from the light source.

33. The method of claim 30, wherein imaging the received light onto the display comprises imaging the received light onto a first portion of the display and wherein reflecting the reflected imaged light back to the display comprises reflecting the reflected imaged light back to a second portion of the display.

34. The method of claim 30, further comprising:
 receiving light into a tunnel at a tunnel entrance aperture, the light having a first cone angle;
 reflecting edge rays of the light off angled sides of the tunnel to change the cone angle of the light;
 transmitting the light through an exit aperture of the tunnel with a second cone angle, and
 wherein receiving light comprises receiving light from the exit aperture of the tunnel.

35. The method of claim 34, wherein reflecting edge rays comprises reflecting edge rays of the light off progressively tapering sides of the tunnel to reduce the cone angle of the light, and wherein the second cone angle is smaller than the first cone angle.

36. A polarized light source system comprising:

an optical system to image light from a light source onto a display, the light from the optical system having an elongated hot spot;

a reflective polarizer to receive the light from the optical system, direct light of a first polarization to the display, and reflect light of a second polarization toward the light source;

a mirror to receive light having the second polarization from the reflective polarizer, and reflect it back to the reflective polarizer, the light from the mirror having a second elongated hot spot; and a polarization conversion system between the reflective polarizer and the mirror to convert the polarization of the reflected light of the second polarization to the first polarization, wherein the reflective polarizer is oriented based on the direction of elongation of the hot spots.

37. The system of claim 36, wherein the reflective polarizer has an axis of greater acceptance and wherein the axis of greater acceptance is aligned in accordance with the hot spots.

38. The system of claim 36, wherein the mirror is formed by a coating on a portion of an optical element of the relay optical system.

39. The system of claim 36, wherein the optical system comprises a set of relay optical elements to image the light from the light source onto the display, wherein the light source is on one side of the optical axis of the relay optical elements, wherein the mirror is on the other side of the optical axis from the light source, and wherein the mirror comprises a coating applied to an element of the set of relay optical elements.

* * * * *